United States Patent [19]

Yamamoto et al.

[11] Patent Number: 4,553,160

[45] Date of Patent: Nov. 12, 1985

[54] PICTURE DATA READING DEVICE

[75] Inventors: Tadashi Yamamoto; Masami Kurata, both of Kanagawa, Japan

[73] Assignee: Fuji Xerox Co., Ltd., Tokyo, Japan

[21] Appl. No.: 487,663

[22] Filed: Apr. 22, 1983

[30] Foreign Application Priority Data

Apr. 23, 1982 [JP] Japan .................................. 57-67332

[51] Int. Cl.⁴ ............................................... H04N 1/46
[52] U.S. Cl. .......................................... 358/75; 358/78
[58] Field of Search ............................. 358/75, 78, 80

[56] References Cited

U.S. PATENT DOCUMENTS 4,467,348 8/1984 Fujii ...................................... 358/78

Primary Examiner—Michael A. Masinick
Attorney, Agent, or Firm—Sughrue, Mion, Zinn, Macpeak, and Seas

[57] ABSTRACT

A data reading device of the type employing a plurality of image sensors for reading separated colors is provided with a delay device in the processing circuitry of at least one of the image sensors. The delay device can be set to delay the signal output from the associated image sensor to an arithmetic circuit for a variable time corresponding to a multiple of the line scanning period. In this manner, the image sensors need not be so accurately positioned that the same line is read by each of the several sensors at the same time, but the picture data signals for the same line can nonetheless be fed to the arithmetic circuit simultaneously.

7 Claims, 3 Drawing Figures

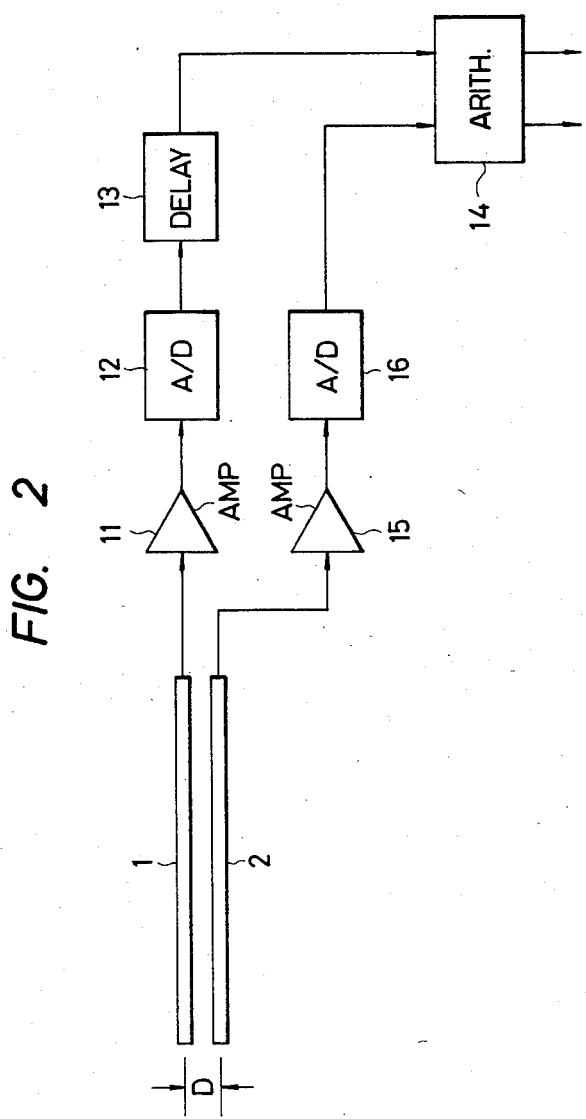

PICTURE DATA READING DEVICE

BACKGROUND OF THE INVENTION

This invention relates to a picture data reading device in which a plurality of one-dimensional image sensors are used to read picture data through color separation.

For instance, an image data reading device for reading picture data by color-separation into black and red employs two one-dimensional image sensors 1 and 2 (hereinafter merely termed "image sensors") shown in FIG. 1. In this device, light beams from light sources 3 and 4 are applied to an original 5, and a light beam reflected from the original 5 is split into two light beams by a reflecting mirror 6. One of the two light beams is applied to the first image sensor 1 via a lens, while the other light beam is applied through a cyan filter 8 and another lens 9 to the second image sensor 2. The outputs of these image sensors 1 and 2 are supplied to a color separating arithmetic circuit, so that two picture signals separated according to black and red data are provided.

It is essential in this picture data reading device that the image sensors 1 and 2 be positioned very accurately so that they scan the same position on the original 5, whereby color-shifting or lowering of the resolution is prevented. However, positioning of the image sensors as described above becomes difficult as the scanning line density is increased. Thus, the conventional picture data reading device is disadvantageous in that even a skilled person requires a long time to accurately position the image sensors.

SUMMARY OF THE INVENTION

In view of the foregoing, an object of this invention is to provide a picture data reading device in which positional adjustment, in the auxiliary scanning direction, of a plurality of image sensors, is readily achieved.

The foregoing object of the invention has been achieved by the provision of a picture data reading device in which picture signal delay means is used to electrically adjust any reading position shift in the auxiliary scanning direction between a plurality of image sensors.

BRIEF DESCRIPTION OF THE DRAWINGS

FIG. 2 is a circuit diagram showing the essential components of one example of a picture data reading device according to this invention.

DETAILED DESCRIPTION OF THE PREFERRED EMBODIMENTS

Figure 1:
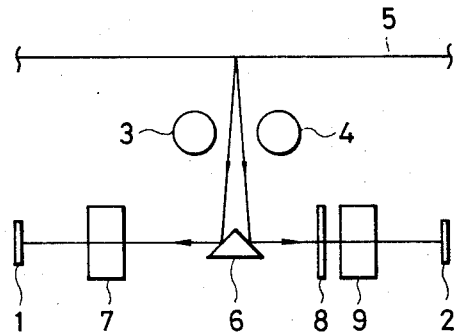
FIG. 1 is an explanatory diagram outlining one example of an optical system of a picture data reading device.

One embodiment of this invention will now be described with reference to FIGS. 2 and 3.

FIG. 2 is a circuit diagram of a picture data reading device according to the invention. Photoelectrically converted image data in the form of a picture signal from a first image sensor 1 is applied through an amplifier 11 to a first binary-encoding circuit 12, where it is binary-encoded, and is then applied through a line delay circuit 13 to an arithmetic circuit 14. A picture signal from a second image sensor 2 is applied through an amplifier to a second binary-encoding circuit 16, where it is binary-encoded, and is then supplied to the arithmetic circuit 14.

Assume that, when the optical system of the device is inspected after being adjusted, it is found that the reading position of the image sensor 1 is advanced by D mm in the auxiliary scanning direction from that of the image sensor 2, and that the auxiliary scanning line density is M/mm. Where the reading line of the second image sensor 2 is employed as a reference line, the reading line of the first image sensor 1 is displaced to one side by as much as D.M lines. For instance in the case where M=8 and D=0.4, D.M=3.2. By rounding this number, the natural number "3" is obtained. In this case, the operator adjusting the device should set the amount of delay of the line delay circuit 13 to an amount corresponding to three (3) lines.

Figure 3:
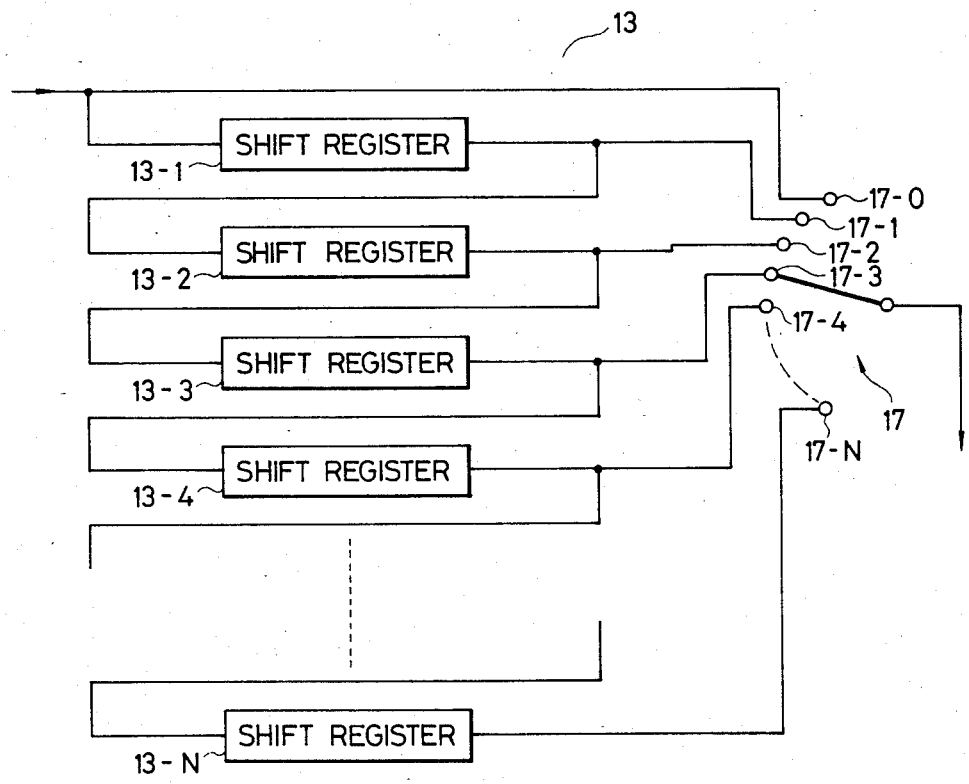
FIG. 3 is a block diagram showing a line delay circuit of the device of FIG. 2.

FIG. 3 shows the line delay circuit in more detail. The line delay circuit 13 has first through N-th shift registers 13-1 through 13-N each storing the picture signals for one line. These shift registers are connected to one another in series. Picture signals from the first binary-encoding circuit 12 are supplied to the first shift register 13-1. The output of the shift registers and the output of the first binary-encoding circuit 12 are connected to the contacts 17-0 through 17-N of an electronic switch 17, respectively. Accordingly, the amount of delay for every line is adjusted by operating the armature of the switch 17.

In the above-described case, as shown in FIG. 3, the contact connected to the output of the third shift register 13-3 is selected, and a picture signal delayed by three lines thus applied to one input terminal of the arithmetic circuit. The picture signal outputted by the second binary-encoding circuit is directly applied to the other input terminal of the arithmetic circuit 14. Accordingly, the arithmetic circuit can subject the picture signals of one and the same line to logical operations, whereby the picture data can be accurately color-separated.

As is apparent from the above description, the picture data reading device according to the invention uses picture signal delaying means to electrically adjust the shift, in the auxiliary direction, between the reading positions of the plurality of image sensors. Accordingly, it is unnecessary to position the image sensors very accurately, contributing to a simplification of image sensor positioning adjusting work and to an improvement in productivity.

In the above-described embodiment, shift registers are employed to delay the picture signals; however, it goes without saying that the same effect can be obtained using ordinary memories.

What is claimed is:

1. A picture data reading device, comprising:
   an optical system for scanning an original line by line and for forming the image of picture data of a scanned position at a plurality of positions;
   one-dimensional image sensors respectively arranged at the image forming surfaces of said optical system, for subjecting picture data to photo-electric conversion for each line;
   means for binary-encoding picture signals outputted by said one-dimensional image sensors; and
   delay means for receiving, from among said picture signals thus binary-encoded, a picture signal other than one which is latest in reading in an auxiliary scanning direction, and for delaying said picture signal thus received by a time corresponding to the number of lines corresponding to a reading position difference between said picture signal and said latest picture signal.

2. A device as claimed in claim 1, said image sensors comprising multi-color reading sensors, said optical system including color separation means for forming at least two sets of optical image data.

3. A device as claimed in claim 1, said delay means comprising picture data line memory means.

4. A device as claimed in claim 1, said delay means comprising a plurality of shift registers.

5. A device as claimed in claim 4, said shift registers being connected in series, outputs of said shift registers being provided to subsequent of said shift registers and to respective output lines.

6. A picture data reading device, comprising;

an optical system for scanning an original line by line and for forming the image of picture data of a scanned position at a plurality of positions;

one-dimensional image sensors respectively arranged at the image forming surfaces of said optical system, for subjecting picture data to photo-electric conversion for each line;

means for binary-encoding picture signals outputted by said one-dimensional image sensors; and delay means for receiving, from among said picture signals thus binary-encoded, a picture signal other than one which is latest in reading in an auxiliary scanning direction, and for delaying said picture signal thus received by a time corresponding to the number of lines corresponding to a reading position difference between said picture signal and said latest picture signal, said delay means comprising a plurality of shift registers connected in series, outputs of said shift registers being provided to subsequent of said shift registers and to respective output lines, switch means receiving a plurality of inputs corresponding to said respective output lines and a direct line from one of said binary-encoding means, for selectively outputting the output of a selected one of said shift registers or that of said one binary-encoding means.

7. A picture data reading device, comprising;

an optical system for scanning an original line by line and for forming the image of picture data of a scanned position at a plurality of positions;

one-dimensional image sensors respectively arranged at the image forming surface of said optical system, for subjecting picture data to photo-electric conversion for each line;

means for binary-encoding picture signals outputted by said one-dimensional image sensors; and delay means for receiving, from among said picture signals thus binary-encoded, a picture signal other than one which is latest in reading in an auxiliary scanning direction, and for delaying said picture signal thus received by a time corresponding to the number of lines corresponding to a reading position difference between said picture signal and said latest picture signal, wherein a pair of said image sensors are provided, and said delay means is inserted between the binary-encoding means associated with one of said image sensors and a following arithmetic circuit, said arithmetic circuit also receiving an output from the binary-encoding means associated with the other of said image sensors.

* * * * *